(12) United States Patent
Wallin et al.

(10) Patent No.: US 9,314,880 B2
(45) Date of Patent: Apr. 19, 2016

(54) CHROMIUM FREE HARDFACING WELDING CONSUMABLE

(75) Inventors: Jack Garry Wallin, Scottsville, KY (US); Ravi Menon, Goodlettsville, TN (US)

(73) Assignee: Stoody Company, Bowling Green, KY (US)

( * ) Notice: Subject to any disclaimer, the term of this patent is extended or adjusted under 35 U.S.C. 154(b) by 367 days.

(21) Appl. No.: 12/909,738

(22) Filed: Oct. 21, 2010

(65) Prior Publication Data

US 2012/0097658 A1 Apr. 26, 2012

(51) Int. Cl.
| | |
|---|---|
| *B23K 35/22* | (2006.01) |
| *B23K 35/30* | (2006.01) |
| *C22C 38/02* | (2006.01) |
| *C22C 38/04* | (2006.01) |
| *C22C 38/08* | (2006.01) |
| *C22C 38/12* | (2006.01) |
| *C22C 38/14* | (2006.01) |
| *C22C 38/00* | (2006.01) |

(52) U.S. Cl.
CPC .......... *B23K 35/3093* (2013.01); *B23K 35/22* (2013.01); *B23K 35/3066* (2013.01); *C22C 38/002* (2013.01); *C22C 38/02* (2013.01); *C22C 38/04* (2013.01); *C22C 38/08* (2013.01); *C22C 38/12* (2013.01); *C22C 38/14* (2013.01)

(58) Field of Classification Search
USPC ............... 219/146.1, 146.22, 146.23, 146.24, 219/146.51; 420/99, 119, 120–123, 127; 228/119
See application file for complete search history.

(56) References Cited

U.S. PATENT DOCUMENTS

| | | | | |
|---|---|---|---|---|
| 1,910,801 | A * | 5/1933 | Kluger | 420/99 |
| 4,008,078 | A * | 2/1977 | Flugge et al. | 420/120 |
| 4,149,063 | A * | 4/1979 | Bishel | 219/146.23 |
| 4,430,122 | A | 2/1984 | Pauga | |
| 5,746,843 | A * | 5/1998 | Miyata et al. | 148/335 |
| 6,702,905 | B1 * | 3/2004 | Qiao et al. | 148/326 |
| 7,425,229 | B2 * | 9/2008 | Frankel et al. | 75/302 |
| 7,696,453 | B2 | 4/2010 | Frankel et al. | |
| 7,743,967 | B2 | 6/2010 | Frankel et al. | |
| 8,557,056 | B2 * | 10/2013 | Angles | 148/225 |
| 2004/0206726 | A1 | 10/2004 | Daemen et al. | |
| 2005/0189337 | A1 * | 9/2005 | Baune | 219/145.23 |
| 2005/0271542 | A1 * | 12/2005 | Frankel et al. | 420/457 |
| 2007/0029295 | A1 * | 2/2007 | Branagan et al. | 219/146.1 |
| 2008/0128393 | A1 * | 6/2008 | Frankel et al. | 219/75 |
| 2008/0173701 | A1 * | 7/2008 | Frankel et al. | 228/262.3 |
| 2009/0258250 | A1 | 10/2009 | Daemen et al. | |
| 2010/0101780 | A1 | 4/2010 | Ballew et al. | |
| 2010/0189592 | A1 * | 7/2010 | Angles | 420/110 |

FOREIGN PATENT DOCUMENTS

| | | | |
|---|---|---|---|
| CH | 165893 A | | 2/1934 |
| GB | 1 152 370 A | | 5/1969 |
| WO | WO2008017341 | * | 2/2008 |
| WO | WO 2011/021751 A1 | | 2/2011 |

OTHER PUBLICATIONS

ARNCO 300XT Product Information.
PCT International Search Report for International Application No. PCT/US2011/057187, date of mailing Jan. 17, 2012.

* cited by examiner

*Primary Examiner* — David Angwin
*Assistant Examiner* — Frederick Calvetti
(74) *Attorney, Agent, or Firm* — Kacvinsky Daisak Bluni PLLC

(57) ABSTRACT

Compositions for Chromium-free hardfacing welding consumables are provided that include between approximately 0.3% and approximately 1.5% Carbon, between approximately 0.2% and approximately 2.5% Manganese, between approximately 0.3% and approximately 1.3% Silicon, between approximately 1.3% and approximately 5.5% Boron, between approximately 1.0% and approximately 4.0% Nickel, between approximately 1.0% and approximately 6.0% of at least one of Titanium and Niobium, and between approximately 0.1% and approximately 2.0% Tungsten and/or Molybdenum. Additional welding consumable compositions and weld deposit compositions are also provided to provide hardfacing materials with little or no Chromium content.

19 Claims, No Drawings

CHROMIUM FREE HARDFACING WELDING CONSUMABLE

FIELD

The present disclosure relates to alloy compositions for arc welding and more particularly to compositions without Chromium for hardfacing applications.

BACKGROUND

The statements in this section merely provide background information related to the present disclosure and may not constitute prior art.

Hardfacing relates generally to techniques or methods of applying a hard, wear resistant alloy to the surface of a substrate, such as a softer metal, to reduce wear caused by abrasion, erosion, corrosion, and heat, among other operational or environmental conditions. A variety of methods are available to apply the wear resistant alloy to the substrate, among which includes welding, where a welding wire (also known as a welding consumable) is deposited over the substrate surface to produce a weld deposit that is highly wear resistant. The welding wire may include a solid wire, metal-cored wire or a flux-cored wire, wherein the metal-cored wire generally comprises a metal sheath filled with a powdered metal alloy and the flux-cored wire generally comprises a mixture of powdered metal and fluxing ingredients.

Many welding wires have compositions that include Chromium to improve wear resistance and hardness. However, during a hardfacing application, the Chromium in the welding wire can produce undesirable levels of Hexavalent Chromium, which can be harmful to end users. End users that breathe Hexavalent Chromium compounds over an extended period of time can experience irritation and/or damage to the nose, throat, and lungs. Additionally, irritation and/or damage to the eyes and skin can occur if Hexavalent Chromium contact is in high concentrations for a prolonged period of time. Therefore, use of Chromium must be closely monitored in order to limit the levels of Hexavalent Chromium that may result from hard-facing operations.

SUMMARY

In one form, a Chromium-free hardfacing welding consumable is provided that comprises, by percent mass, between approximately 0.3% and approximately 1.5% Carbon, between approximately 0.2% and approximately 2.5% Manganese, between approximately 0.3% and approximately 1.3% Silicon, between approximately 1.3% and approximately 5.5% Boron, between approximately 1.0% and approximately 4.0% Nickel, between approximately 1.0% and approximately 6.0% of at least one of Titanium and Niobium, and between approximately 0.1% and approximately 2.0% Tungsten.

In another form, a Chromium-free hardfacing welding consumable is provided that comprises, by percent mass, between approximately 0.3% and approximately 1.5% Carbon, between approximately 0.2% and approximately 2.5% Manganese, between approximately 0.3% and approximately 1.3% Silicon, between approximately 1.3% and approximately 5.5% Boron, between approximately 1.0% and approximately 4.0% Nickel, between approximately 1.0% and approximately 6.0% of at least one of Titanium and Niobium, and between approximately 0.1% and approximately 2.0% Molybdenum.

In yet another form, a weld deposit composition is provided that comprises, by percent mass, between approximately 0.15% and approximately 1.4% Carbon, between approximately 0.15% and approximately 2.0% Manganese, between approximately 0.15% and approximately 1.0% Silicon, between approximately 0.8% and approximately 3.8% Nickel, between approximately 0.8% and 6.0% at least one of Titanium and Niobium, between approximately 0.8% and approximately 4.5% Boron and between approximately 0.1% and approximately 2.0% Tungsten and/or Molybdenum.

DETAILED DESCRIPTION

The following description is merely exemplary in nature and is not intended to limit the present disclosure, application, or uses. It should be understood that throughout the drawings, corresponding reference numerals indicate like or corresponding parts and features.

Generally, a Chromium-free welding consumable is provided that is particularly suitable for producing hardfacing/hardsurfacing weld deposits, with wear resistance and hardness equal to or greater than that of standard Chromium containing hardfacing deposits. The consumable contains no Chromium, thus reducing or eliminating the emission of Hexavalent Chromium during the welding process.

The welding consumable, or wire, is manufactured by forming a mild steel sheath into a tube and filling it with various alloy powders and drawing it to size. When welded, the sheath and alloy powders produce a martensitic weld deposit matrix with finely dispersed boron carbides as well as titanium and/or niobium carbides and borides, in addition to Molybdenum and Tungsten carbides and borides.

The present disclosure, in one form, includes a metal-cored welding wire that comprises, by percent mass, between approximately 0.3 and approximately 1.5% Carbon, between approximately 0.2 and approximately 2.5% Manganese, between approximately 0.3 and approximately 1.3% Silicon, between approximately 1.3 and approximately 5.5% Boron, between approximately 1.0% and approximately 4.0% Nickel, between approximately 1.0% and approximately 6.0% Titanium and/or Niobium, and Tungsten and/or Molybdenum between approximately 0.1 and approximately 2.0%.

In another form of the present disclosure, for which certain testing has been conducted, a Chromium-free welding consumable and its weld deposit composition are set forth below (by percent mass) in Table 1:

TABLE 1

|  | C | Mn | Si | Cr | Ni | Nb | W | Mo | B | Fe |
|---|---|---|---|---|---|---|---|---|---|---|
| Cr Free Wire Composition | 1.0 | 2.0 | 0.8 | 0.00 | 2.0 | 3.1 | 0.5 | 0.5 | 4.2 | Bal |
| Weld Deposit Composition | 0.8 | 1.8 | 0.6 | 0.01 | 1.9 | 3.0 | 0.4 | 0.4 | 3.8 | Bal |

As shown, there is no Chromium content in the welding consumable itself, and very low levels of Chromium result in the weld deposit. Therefore, during hardfacing operations, the levels of Hexavalent Chromium are well below the OSHA (Occupational Safety & Health Administration) Permissible Exposure Limits for all industries. It should be understood that these compositions are merely exemplary and that slight variations of the percentages to produce the desired result of little to no Chromium in the weld deposit are to be construed as falling within the scope of the present disclosure.

Carbon (C) is an element that improves hardness and strength. The preferred amount of Carbon, in one form of the present disclosure, comprises, by percent mass, between approximately 0.3% and approximately 1.5% in the welding consumable. In one form of a weld deposit, the amount of Carbon comprises, by percent mass, between approximately 0.15% and approximately 1.4%.

Manganese (Mn) is an element that improves the strength and hardness and acts as a deoxidizer, in which the deoxidizer also acts as a grain refiner when fine oxides are not floated out of the metal. The preferred amount of Manganese, in one form of the present disclosure, by percent mass, between approximately 0.2% and approximately 2.5% in the welding consumable. In one form of a weld deposit, the amount of Manganese comprises, by percent mass, between approximately 0.15% and approximately 2.0%.

Silicon (Si) is an element that acts as a deoxidizer and also as a grain refiner when fine oxides are not floated out of the metal. The preferred amount of Silicon, in one form of the present disclosure, is by percent mass, between approximately 0.3% and approximately 1.3% in the welding consumable. In one form of a weld deposit, the amount of Silicon comprises, by percent mass, between approximately 0.15% and approximately 1.0%.

Boron (B) is an element that provides a fine structure to the weld overlay and to further enhance the hardness. Furthermore, Boron provides interstitial hardening in the matrix, strengthens the grain boundaries by accommodating mismatches due to incident lattice angles of neighboring grains with respect to the common grain boundary, and by itself or in combination with Carbon, form nucleation sites as intermetallics with Titanium and/or Niobium. The preferred amount of Boron, in one form of the present disclosure, is by percent mass, between approximately 1.3% and approximately 5.5% in the welding consumable. In one form of a weld deposit, the amount of Boron comprises, by percent mass, between approximately 0.8% and approximately 4.5%.

Nickel (Ni) is an element that provides improved ductility, which improves resistance to impacts of the hardfacing overlay. The preferred amount of Nickel, in one form of the present disclosure, is by percent mass, between approximately 1.0% and approximately 4.0% in the welding consumable. In one form of a weld deposit, the amount of Nickel comprises, by percent mass, between approximately 0.8% and approximately 3.8%.

Titanium (Ti) acts as a grain refiner and as a deoxidizer and is also a part of the Titanium Carbide precipitates that improve wear resistance of the weld overlay. Niobium (Nb) acts as a carbide former and is also a part of the Niobium Carbide precipitates that improve wear resistance of the weld overlay. The preferred amount of Titanium and/or Niobium, in one form of the present disclosure, is by percent mass, between approximately 1.0% and approximately 6.0% in the welding consumable. In one form of a weld deposit, the amount of Titanium and/or Niobium comprises, by percent mass, between approximately 0.8% and approximately 6.0%.

Tungsten (W) and/or Molybdenum (Mo) are provided to improve hardness and corrosion resistance. More specifically, Tungsten and/or Molybdenum are alloying elements that can be used in steels to modify the structure by providing solid solution strengthening of the matrix. Tungsten also combines with Boron and Carbon to form borides and carbides, thus improving the wear performance of the overlay. Molybdenum, in addition to providing matrix strengthening, also enhances the corrosion resistance of the overlay. The preferred amount of Tungsten and/or Molybdenum, in one form of the present disclosure, is by percent mass, between approximately 0.1% and approximately 2.0% in the welding consumable. In one form of a weld deposit, the amount of Tungsten and/or Molybdenum comprises, by percent mass, between approximately 0.1% and approximately 2.0%.

The fine grain size of the matrix combined with small evenly dispersed carbides and borides contributes to the weld deposit to improve wear resistance. Deoxidizers such manganese and silicon have been added, which also act as grain refiners when fine oxides are not floated out of the metal. The percent weight boron as well as Titanium and/or Niobium has been balanced with the carbon so that when the carbide is formed, the matrix is depleted of both carbon and the carbide forming element. The resulting small amount of carbon and the addition of Tungsten and/or Molybdenum in the matrix allow the weld deposit to retain its corrosion resistance, while the finely dispersed carbides and borides greatly improve the wear resistance.

Other forms of the present disclosure include consumables for the shielded metal arc and flux cored arc welding processes.

In general, the welding consumable of present disclosure will consistently produce a Chromium-free weld deposit, or a weld deposit with very little Chromium, which has equal or better wear resistance when compared to typical Chromium carbide hardfacing welding consumables that contain 15 to 40% Chromium. Table 2 below compares hardness, Chromium content, and wear resistance of a single layer weld deposit of the consumable of the present disclosure to a typical Chromium carbide and martensitic consumable. The wear test was conducted per ASTM G-65 procedure A using 6,000 revolutions. (Chromium content is the undiluted weld metal percent by weight).

TABLE 2

| Welding Consumable | Hardness (HRC) | G-65 Wear Loss (grams) | Percent Chromium Content of Electrode | Percent Hexavalent Cr Content of Fume |
|---|---|---|---|---|
| Welding electrode of present disclosure | 65 to 69 | 0.14-.15 | 0.0% | <0.005 |
| Typical Chromium carbide | 56 to 63 | 0.15-.19 | 15-40% | 0.03-0.14 |
| Typical Martensitic | 55 to 60 | 1.30-1.70 | 5-16% | 0.023 |

The description of the disclosure is merely exemplary in nature and, thus, variations that do not depart from the gist of the disclosure are intended to be within the scope of the disclosure. For example, the weld deposit according to the teachings of the present disclosure may be produced from welding wire such as flux-core wires, metal-cored wires, or solid wires, while remaining within the scope of the disclosure. Such variations are not to be regarded as a departure from the spirit and scope of the disclosure.

What is claimed is:

1. A Chromium-free hardfacing welding consumable consisting of, by percent mass:
   between 0.3% and 1.5% Carbon;
   between 0.2% and 2.5% Manganese;
   between 0.3% and 1.3% Silicon;
   between 1.3% and 5.5% Boron;
   between 1.0% and 4.0% Nickel;
   between 1.0% and 6.0% of at least one of Titanium and Niobium;
   between 0.1% and 2.0% Tungsten; and
   the remainder being iron to total 100%.

2. The welding consumable according to claim 1, wherein the Carbon is 1.0%.

3. The welding consumable according to claim 1, wherein the Manganese is 2.0%.

4. The welding consumable according to claim 1, wherein the Silicon is 0.8%.

5. The welding consumable according to claim 1, wherein the Boron is 4.2%.

6. The welding consumable according to claim 1, wherein the Nickel is 2.0%.

7. The welding consumable according to claim 1, wherein the at least one of Titanium and Niobium comprises approximately 3.1%.

8. The welding consumable according to claim 1, wherein the Titanium is 3.1%.

9. The welding consumable according to claim 1, wherein the Niobium is 3.1%.

10. The welding consumable according to claim 1, wherein the Tungsten is 1.0%.

11. A Chromium-free hardfacing welding consumable comprising consisting of, by percent mass:
    1.0% Carbon;
    2.0% Manganese;
    0.8% Silicon;
    4.2% Boron;
    2.0% Nickel; and
    3.1% of at least one of Titanium and Niobium
    0.5% of at least one of Tungsten and Molybdenum; and
    the remainder being iron to total 100%.

12. The welding consumable according to claim 11, wherein the Titanium is 3.1%.

13. The welding consumable according to claim 11, wherein the Niobium is 3.1%.

14. A Chromium-free hardfacing welding consumable consisting of, by percent mass:
    between 0.3% and 1.5% Carbon;
    between 0.2% and 2.5% Manganese;
    between 0.3% and 1.3% Silicon;
    between 1.3% and 5.5% Boron;
    between 1.0% and 4.0% Nickel;
    between 1.0% and 6.0% of at least one of Titanium and Niobium; and
    between 0.1% and 2.0% Molybdenum; and
    the remainder being iron to total 100%.

15. The welding consumable according to claim 14, wherein the at least one of Titanium and Niobium comprises approximately 3.1%.

16. The welding consumable according to claim 14, wherein the Titanium is 3.1%.

17. The welding consumable according to claim 14, wherein the Niobium is 3.1%.

18. The welding consumable according to claim 14, wherein the Molybdenum is 1.0%.

19. The welding consumable according to claim 1, wherein the welding consumable comprises a welding electrode having a hardness (HRC) ranging from 65 to 69.

\* \* \* \* \*